United States Patent [19]

Shouman

[11] Patent Number: 5,896,740
[45] Date of Patent: Apr. 27, 1999

[54] DUAL CYCLE TURBINE ENGINE HAVING INCREASED EFFICIENCY AND HEAT RECOVERY SYSTEM FOR USE THEREIN

[76] Inventor: Ahmad R. Shouman, 1006 Bloomdale Dr., Las Cruces, N.M. 88005

[21] Appl. No.: 08/710,159

[22] Filed: Sep. 12, 1996

[51] Int. Cl.⁶ ................................ F02C 3/30; F02C 6/18
[52] U.S. Cl. ...................................... 60/39.182; 60/39.55
[58] Field of Search ............................ 60/39.181, 39.182, 60/39.55; 122/7 B

[56] References Cited

U.S. PATENT DOCUMENTS

| | | | |
|---|---|---|---|
| 2,663,145 | 12/1953 | Waeselynk | 60/39.182 |
| 4,057,966 | 11/1977 | Prutkovsky et al. | 60/39.182 |
| 5,069,685 | 12/1991 | Bissett et al. | 60/39.182 |

*Primary Examiner*—Louis J. Casaregola
*Attorney, Agent, or Firm*—Calvin B. Ward

[57] ABSTRACT

A dual cycle engine which includes both a steam turbine and a gas turbine. The engine includes an air compressor and a combustion chamber connected to the air compressor for burning fuel with air from the air compressor to generate a first gaseous output which drives a gas turbine. The engine also includes a heat recovery system for recovering heat from the gaseous output of the gas turbine after the gaseous output has passed through the gas turbine. The heat recovery system includes a heat exchanger for extracting heat from the gaseous output and for heating an input water stream to generate steam. The steam is heated further in a superheater that burns fuel and air at the same pressure as the combustion chamber to generate a second gaseous output that is combined with the output of the combustion chamber prior to the output from the combustion chamber being passed through the gas turbine. The steam from the superheater is expanded in a steam turbine to generate work therefrom. In the preferred embodiment of the present invention, the heat exchanger is a supercritical heat exchanger. The water input stream is preferably generated by condensing water from the gaseous output after the gaseous output has passed through the heat exchanger. The superheater may be constructed by utilizing a heat exchanger in the combustion chamber. In embodiments of the present invention that utilize a steam injected gas turbine, the steam injection is provided by the output of the steam turbine.

10 Claims, 3 Drawing Sheets

DUAL CYCLE TURBINE ENGINE HAVING INCREASED EFFICIENCY AND HEAT RECOVERY SYSTEM FOR USE THEREIN

FIELD OF THE INVENTION

The present invention relates to gas turbine engines, and more particularly, to systems for increasing the efficiency of systems utilizing a gas turbine engine.

BACKGROUND OF THE INVENTION

In a conventional single shaft gas turbine engine, a compressor introduces air into a combustion chamber in which the air is mixed with the burning fuel to produce gases that drive a turbine. The turbine drives a load consisting of the compressor and an external load. In a dual shaft gas turbine, the compressor is driven by a turbine that is separate from the load turbine. The two turbines are not mechanically connected. They are only gas dynamically connected. The gases from the first turbine pass through the second turbine after leaving the first turbine. The compressor is usually driven by the high pressure turbine with the combination of the compressor and turbine being referred to as the gas generator. However, schemes in which the compressor is driven by the low pressure turbine are also known. To simplify the following discussion, a single shaft turbine will be used; however, it will be apparent to those skilled in the art that the teachings of the present invention may be equally applied to a dual turbine configuration. The efficiency of such a turbine design improves with increasing operating temperatures; however, there is a limit to the operating temperature dictated by the temperature at which the turbine blades and related systems fail.

To further increase the efficiency of the engine, the energy that is discarded in the exhaust gases from the turbine must be reclaimed. Schemes in which the exhaust gases are used to heat water in a boiler to generate steam for a steam turbine are known to the art. The efficiency of the steam turbine is determined by the temperature of the steam which, in turn, is determined by the temperature of the exhaust gases leaving the gas turbine. Since the exhaust gases are typically at a temperature of 1000° F., prior art systems utilize steam turbines that operate at temperatures of 1000° F. or less. Since the efficiency of the steam turbine cycle is determined by the temperature of the input steam, any increase in the steam inlet temperature without changing the exhaust temperature will further improve the efficiency of the combined engine.

As noted above, to maintain the temperature below this maximum temperature of the turbine blades, the fuel to air ratio in the combustion chamber is maintained below the point at which stoichiometric combustion of the fuel is achieved. The additional air maintains the gases below the maximum operating temperature. Unfortunately, the energy needed to compress this additional air reduces the overall efficiency of the engine.

These observations have led to gas turbine designs in which steam and/or water is injected into the combustion system. For example, Dah Yu Cheng (U.S. Pat. Nos. 3,978, 661, 4,128,994 and 4,297,841) recognized that steam addition to the Brayton cycle can significantly increase the power and efficiency of the engine provided heat is recovered from the exhaust gases. The power generated by the drive turbine at any given temperature is determined by the specific heat of the gases expanding through the turbine. Since steam has about twice the specific heat of air, the use of steam as the coolant significantly improves the power that can be generated by the turbine.

Unfortunately, the amount of heat that leaves the system in the exhaust gases also increases when steam is used. The exhaust gases generated in a steam injected engine leave at a higher temperature and have a higher specific heat. Hence, in the absence of some form of heat recovery system, the overall efficiency of the engine decreases. Cheng used a heat recovery boiler to recover the heat from the exhaust gases of the turbine to produce steam. Because of the pinch point limitation on the operating pressure of the heat recovery boiler, and hence the operating pressure ratio of the turbine, the maximum achievable efficiency was limited in this system. Patton and Shouman (U.S. Pat. No. 4,841,721) solved the pinch point problem by operating the combustor of the gas turbine at a pressure above the supercritical pressure of water. They replaced the boiler by a series of regenerative feed water heaters. Shouman (U.S. Pat. No. 5,491,968) describes a combustion system composed of a wet oxidation reactor to which is added, in series, a second stage combustor to produce the desired turbine inlet temperature. This combustion system replaces the conventional gas turbine combustor when a wet oxidation reactor is used.

Broadly, it is the object of the present invention to provide an improved heat recovery system for use in a gas turbine engine system.

It is a further object of the present invention to provide a heat recovery system that improves the efficiency of water/steam injected gas turbine systems.

These and other objects of the present invention will become apparent to those skilled in the art from the following detailed description of the invention and the accompanying drawings.

SUMMARY OF THE INVENTION

The present invention is a dual cycle engine which includes both a steam turbine and a gas turbine. The engine includes an air compressor and a combustion chamber connected to the air compressor for burning fuel with air from the air compressor to generate a first gaseous output which drives a gas turbine. The engine also includes a heat recovery system for recovering heat from the gaseous output of the gas turbine after the gaseous output has passed through the gas turbine. The heat recovery system includes a heat exchanger for extracting heat from the gaseous output and for heating an input water stream to generate steam. The steam is heated further in a superheater that burns fuel and air at the same pressure as the combustion chamber to generate a second gaseous output that is combined with the output of the combustion chamber prior to the output from the combustion chamber being passed through the gas turbine. The steam from the superheater is expanded in a steam turbine to generate work therefrom. In the preferred embodiment of the present invention, the heat exchanger is a supercritical heat exchanger. The water input stream is preferably generated by condensing water from the gaseous output after the gaseous output has passed through the heat exchanger. The superheater may be constructed by utilizing a heat exchanger in the combustion chamber. In embodiments of the present invention that utilize a steam injected gas turbine, the steam injection is provided by the output of the steam turbine.

DETAILED DESCRIPTION OF THE INVENTION

Figure 1:
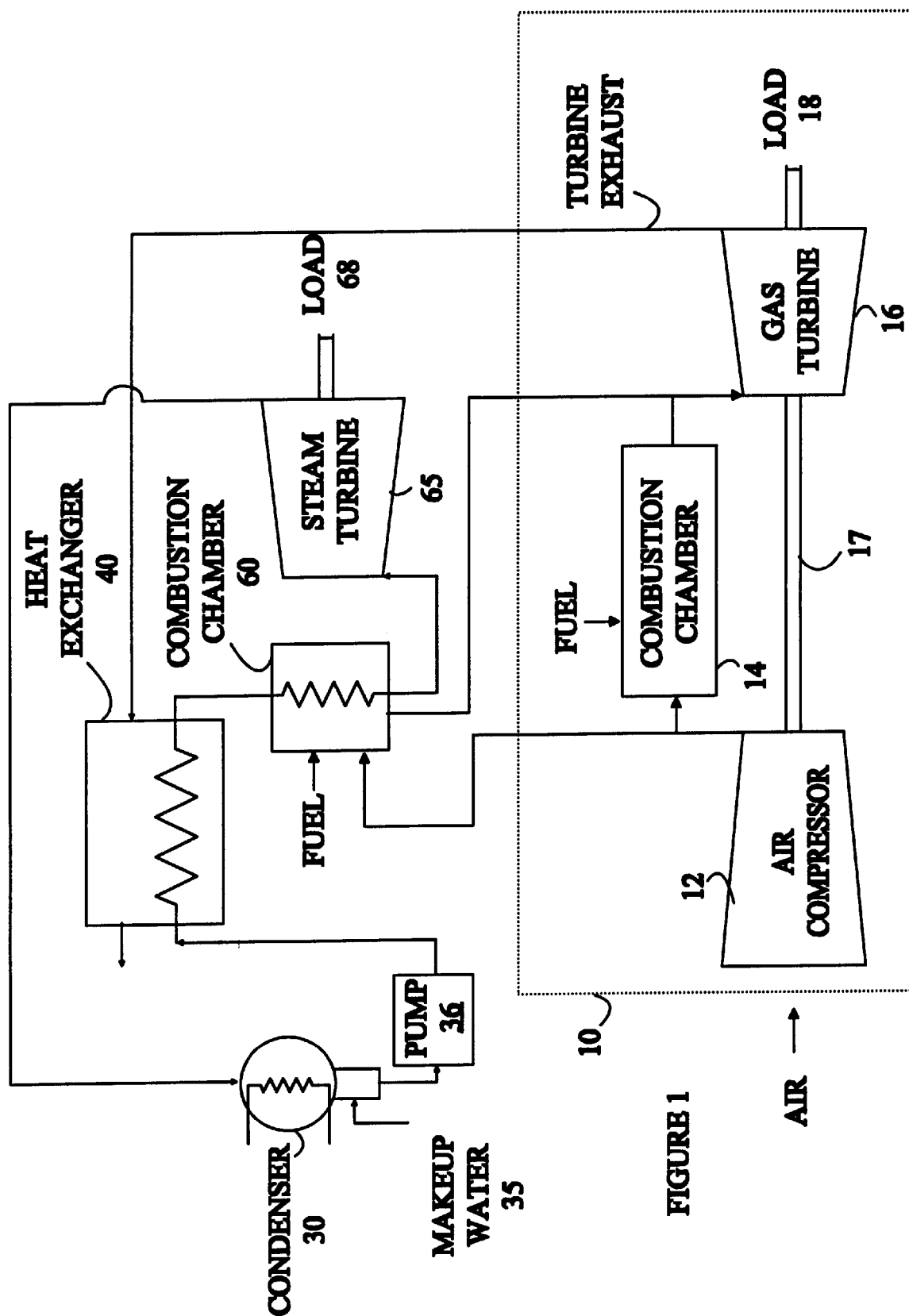
FIG. 1 is a block diagram of a conventional combined cycle gas turbine engine that has been retrofitted with a heat recovery system according to the present invention.

The present invention may be more easily understood with reference to the modifications needed to a conventional gas turbine engine to provide a heat recovery system according to the present invention. Refer now to FIG. 1 which is a block diagram of a conventional gas turbine engine 10 that has been retrofitted with a heat recovery system according to the present invention. Combustion chamber 14 is supplied with air by compressor 12. The fuel burned in combustion chamber 14 generates additional gases as well as heating the compressed air. The expanding gases drive turbine 16 which is connected to the load 18. Drive turbine 16 also drives compressor 12 via shaft 17.

As noted above, there is a substantial amount of heat in the turbine exhaust which is wasted if the exhaust is vented to the atmosphere. In addition, the exhaust stream contains a substantial amount of water in the form of superheated steam. In the present invention, the heat from the exhaust stream is captured in a the supercritical heat exchanger 40. The use of a supercritical heat exchanger avoids the "pinch point" limitations encountered when conventional boilers are used to recapture the heat from the exhaust stream. The gases leaving heat exchanger 40 are exhausted to the atmosphere. The steam leaving the steam turbine is condensed in condenser 30 which can operate at atmospheric or sub-atmospheric pressure. The operating pressure of the condenser must be chosen to produce the best economics of the engine in terms of initial cost as well as operating cost. The condenser is equipped with a sump of the desired capacity. Additional water is supplied to the condenser sump to compensate for any steam or water leakage from the system.

Condensed water is pumped by pump 36 to a pressure above the critical pressure of water through heat exchanger 40. The heated supercritical water leaves heat exchanger 40 and is heated further in a second combustion chamber 60. Combustion chamber 60 is operated at the same pressure as combustion chamber 14. The exhaust gases from combustion chamber 60 are mixed with the gases from combustion chamber 14 and used to drive turbine 16. Hence, the energy captured by combustion gases in combustion chamber 60 is utilized to drive the gas turbine.

The water/steam entering combustion chamber 60 is typically at a temperature of 1000° F. Combustion chamber 60 increases this temperature to the same value as that at the turbine inlet which is about 2000° F. The steam is then applied to steam turbine 65 to drive load 68. The added temperature provided by combustion chamber 60 substantially increases the efficiency of steam turbine 65 relative to the conventional steam turbine recovery systems. Since no waste heat is generated in combustion chamber 60, this increase in efficiency is obtained without any compensating loss in efficiency elsewhere in the system.

It should be noted that prior art dual cycle systems that utilize boilers to capture the heat from the turbine exhaust stream cannot provide the same level of efficiency as the present invention because the boilers are at the maximum pressure dictated by the pinch point. To gain the maximum increase in efficiency, such systems must use multiple boilers operated at different pressures. The additional boilers substantially increase the cost of such systems.

Figure 2:
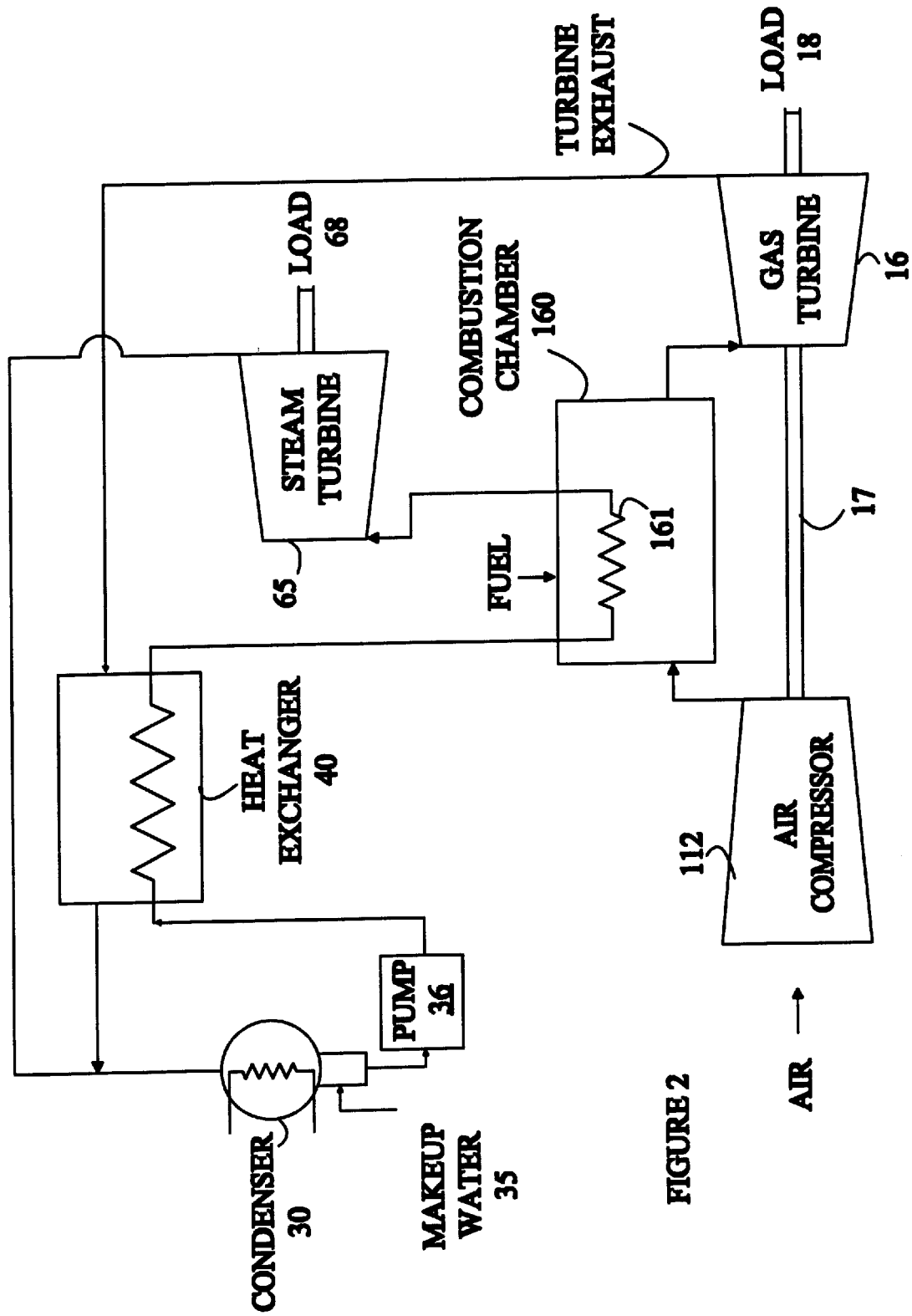
FIG. 2 is a block diagram of a combined cycle gas turbine engine having a heat recovery system according to the present invention.

The embodiment of the present invention shown in FIG. 1 utilized a separate combustion chamber for generating the input to steam turbine 65. While this embodiment is useful in understanding the present invention, the preferred embodiment of the present invention utilizes a single combustion chamber which has been modified to include the heat exchanger for further heating the water from heat exchanger 40. Refer now to FIG. 2 which is a block diagram of a gas turbine engine having a heat recovery system according to the present invention. To simplify the following discussion, those components that serve the same functions as like components discussed with respect to FIG. 1 have been given the same numerals as used in FIG. 1 for the components in question. Turbine assembly 100 differs from that shown in FIG. 1 in that combustion chambers 14 and 60 have been replaced by a single combustion chamber 160 which includes a heat exchanger 161 for heating the water recaptured from the turbine exhaust stream that has been preheated in heat exchanger 40.

The above described embodiments of the present invention have utilized a conventional combine cycle gas turbine engine. As noted above, water/steam injected gas turbines provide significant advantages over conventional gas turbines. The present invention is particularly well adapted for use in water injected gas turbines. When the present invention is utilized with a conventional combined cycle gas turbine, the steam from the steam turbine is condensed in the condenser. In conventional steam turbines, the exhausted steam is condensed to allow the steam turbine to operate at the greatest possible temperature differential. The cost of the low pressure equipment needed to accomplish this is a substantial portion of the cost of a conventional steam turbine system. Alternatively, the condenser of the steam turbine can be operated at a higher pressure and a bottom cycle as suggested by Patton and Shouman (U.S. Pat. No. 4,841,721) may be used. However, once again, the additional equipment substantially increases the cost of the system.

Figure 3:
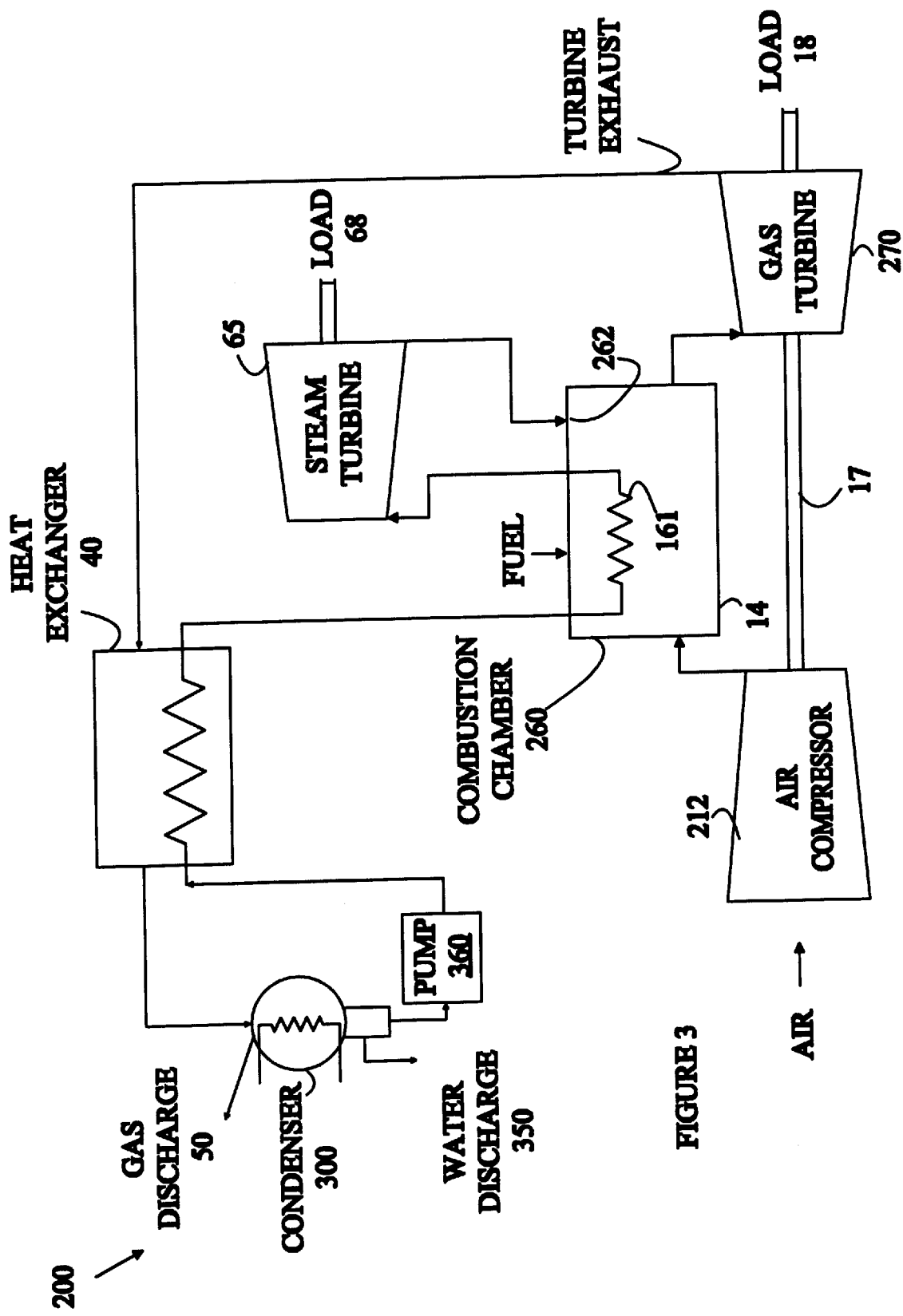
FIG. 3 is a block diagram of a power plant that utilizes a steam injected gas turbine and a steam turbine according to the present invention.

The present invention avoids this costly low pressure equipment by utilizing the exhaust steam for the steam injection needed by the gas turbine. Refer now to FIG. 3 which is a block diagram of a power plant 200 that utilizes a steam injected gas turbine comprising air compressor 212, combustion chamber 260 and gas turbine 270. To simplify the following discussion, those components that serve the same functions as like components discussed with respect to FIG. 2 have been given the same numerals as used in FIG. 2 for the components in question. While the air compressor, combustion chamber, and gas turbine perform analogous functions to components shown in FIG. 2, the capacities and characteristics of these components will, in general, differ from the capacities of the corresponding components, and hence, these components have been given different numerical designations.

Combustion chamber 260 includes a heat exchanger 161 and a steam injection port 262. The steam source for port 262 is the exhaust steam from steam turbine 65. Hence, any heat remaining in the exhaust from steam turbine 265 is captured by combustion chamber 260 and used in the operation of gas turbine 270. As a result, steam turbine 265 operates with an exhaust steam partial pressure considerably lower than atmospheric pressure even though the condenser operates at atmospheric pressure. This produces the same effect of condensing steam at subatmospheric pressure without the need for a costly steam low pressure turbine section. The gases leaving heat exchanger 40 enter condenser 300 which can operate at or below atmospheric pressure. The non-condensable gases are discharged through line 50 to the atmosphere. If the condenser is operated at sub-atmospheric pressure, the compressor must be used to discharge the gases through line 50. The condenser is equipped with a sump of the desired capacity. A float valve maintains a constant water level in the sump. Any excess water is drained through a pump when the condenser is operated at sub-atmospheric pressure.

Pump 360 pumps the condensed water to a pressure above the critical pressure of water through heat exchanger 40. The heated supercritical water leaves heat exchanger 40 and is heated further in combustion chamber 260 through the superheater 161. The superheated steam leaves the superheater 161 and is fed to steam turbine 65. The steam leaving steam turbine 65 is fed into the gas turbine combustion chamber 260 where it is mixed with the combustion gases.

The steam and gas turbines have been shown driving different loads in the embodiments discussed above. However, it will be apparent to those skilled in the art that these loads can be a common drive shaft connected to a common load.

Various modifications to the present invention will become apparent to those skilled in the art from the foregoing description and accompanying drawings. Accordingly, the present invention is to be limited solely by the scope of the following claims.

What is claimed is:

1. An engine comprising:
   an air compressor;
   a combustion chamber connected to said air compressor for burning fuel with air from said air compressor to generate a gaseous output;
   a gas turbine driven by said gaseous output of said combustion chamber passing therethrough; and
   heat recovery means for recovering heat from said gaseous output after said gaseous output has passed through said gas turbine, wherein said heat recover means comprises:
   a first heat exchanger for extracting heat from said gaseous output and for heating an input water stream to generate steam;
   a superheater comprising a second heat exchanger located in said combustion chamber for further heating said steam; and
   a steam turbine for expanding said steam to generate work therefrom and creating a steam output.

2. The engine of claim 1 wherein said first heat exchanger comprises a heat exchanger in which water is maintained at a pressure above the critical pressure of water.

3. The engine of claim 1 further comprising means for condensing water from said steam output, said condensed water providing at least a portion of said input water stream.

4. The engine of claim 1 wherein said combustion chamber further comprises means for receiving steam and combining said steam with gases generated by the burning of said fuel, said steam/gas mixture comprising said combustion chamber gaseous output.

5. The engine of claim 1 further comprising means for condensing water from said gaseous output after said gaseous output has passed through said heat exchanger, said condensed water providing said input water stream.

6. A heat recovery system for generating work from exhaust gases of a gas turbine engine, said gas turbine engine being driven by the output of a combustion chamber in which fuel and air are burned to generate an input gas stream that is expanded in a gas turbine, said heat recovery system comprising:
   a first heat exchanger for extracting heat from said exhaust gases and for heating an input water stream to generate steam;
   a superheater comprising a second heat exchanger located in said combustion chamber for further heating said steam; and
   a steam turbine for expanding said steam to generate work therefrom and creating a steam output.

7. The engine of claim 6 wherein said first heat exchanger comprises a heat exchanger in which water is maintained at a pressure above the critical pressure of water.

8. The engine of claim 7 further comprising means for condensing water from said gaseous output after said exhaust gases have passed through said first heat exchanger, said condensed water providing said input water stream.

9. The engine of claim 7 further comprising means for condensing water from said steam output, said condensed water providing at least a portion of said input water stream.

10. The engine of claim 7 wherein said combustion chamber further comprises means for receiving steam and combing said steam with gases generated by the burning of said fuel, said steam/gas mixture comprising said combustion chamber exhaust gases.

* * * * *

UNITED STATES PATENT AND TRADEMARK OFFICE
CERTIFICATE OF CORRECTION

PATENT NO : 5,896,740
DATED : 04/27/99
INVENTOR(S) : Shouman

It is certified that error appears in the above-identified patent and that said Letters Patent is hereby corrected as shown below:

Column 3, line 23 – Delete "a" between "in" and "the"

Column 3, line 67 – Replace "utilized" with - - utilizes - -

Column 4, line 19 – Replace "combine" with - - combined - -

Column 4, line 32 – Delete "can be" after "turbine '

Column 4, line 48 – Add - - the - - between "to" and "components"

Column 4, line 62 - Replace "of" with - - as - - after "effect"

In the claims

Column 5, line 37 – Replace "recover" with - - recovery - - after "heat"

Signed and Sealed this

Nineteenth Day of October, 1999

Q. TODD DICKINSON

Attest:

Attesting Officer

Acting Commissioner of Patents and Trademarks